United States Patent Office 3,074,964
Patented Jan. 22, 1963

3,074,964
PROCESS FOR THE PRODUCTION OF GAMMA-BUTYROLACTONE AND GAMMA-HYDROXY-BUTYRALDEHYDE
Andrew P. Dunlop, Riverside, and Edward Sherman, Chicago, Ill., assignors to The Quaker Oats Company, Chicago, Ill., a corporation of New Jersey
No Drawing. Filed Apr. 3, 1961, Ser. No. 99,982
10 Claims. (Cl. 260—343.6)

This is a continuation-in-part of our copending application of the same title Serial No. 32,529, filed May 31, 1960, now abandoned.

This invention relates to the preparation of the following compounds from tetrahydrofuran:

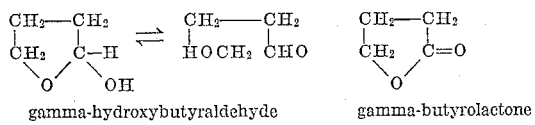

More particularly, it relates to a novel process for the economical production of these valuable compounds by a process of halogenation under specific conditions which effect controlled oxidation.

Heretofore, chlorination of tetrahydrofuran has been reported to give 2,3-dichlorotetrahydrofuran, 2-(4′-chlorobutoxy)-3-clorotetrahydrofuran and polychlorinated products. It was not appreciated, however, that if halogenation of tetrahydrofuran were carried out under the controlled conditions of the present invention, substantial yields of valuable gamma-hydroxybutyraldehyde and/or gamma-butyrolactone can be obtained. This discovery is particularly noteworthy in view of the favorable economics resulting from the fact that inexpensive chlorine may be used to obtain the desired products.

In accordance with the present invention, tetrahydrofuran is contacted in the liquid phase in the presence of water with a halogen selected from the group consisting of chlorine, bromine and mixtures thereof, preferably chlorine. The resulting reaction mixture contains, in substantial yields, gamma-butyrolactone or gamma-hydroxybutyraldehyde in admixture with gamma-butyrolactone, the total yield or yields and proportion of each depending, in part, on the ratio of reactants and/or the particular reaction conditions employed, as further described hereinafter. The reaction product containing the valuable compound or compounds of the present invention may be utilized as such. Alternatively, any unreacted tetrahydrofuran in the reaction product may be recovered for reuse and the compound or compounds separated by conventional recovery and separation techniques to be described briefly hereinafter.

The amount of halogen employed with respect to the amount of tetrahydrofuran can be varied over a substantial range. It is preferable, however, to employ an amount of halogen which is not substantially in excess of about 2 moles per mole of tetrahydrofuran, e.g., about 0.01 to 2 moles of halogen per mole of tetrahydrofuran. Where substantial yields of gamma-hydroxy-butyraldehyde, as well as gamma-butyrolactone, are desired, it is particularly preferable to operate at a level of about 0.05 to 0.4 mole of halogen per mole of tetrahydrofuran. When the yield of gamma-butyrolactone is to be maximized, substantially higher ratios of halogen to tetrahydrofuran should be used, e.g., about 1 to 2 moles of halogen per mole of tetrahydrofuran, preferably about the theoretical amount of halogen, i.e., 2 moles of halogen per mole of tetrahydrofuran.

The rate at which the halogen is added to the reaction mixture may be varied over a considerable range. The preferred ratio is about the maximum at which the halogen is completely consumed by the reaction mixture under the environmental conditions provided. This preferred ratio is readily ascertained for any particular environmental conditions by, for example, visual detection of any color change in the substrate.

The amount of water employed with respect to the amount of tetrahydrofuran may also be varied over a substantial range. To avoid undesired side reactions, at least about 1 mole of water per mole of tetrahydrofuran, e.g., about 1 to 25 moles per mole, should be present in the reaction mixture as the halogen is initially introduced. Preferably, the initial composition of the reaction medium should contain about 2 to 15 moles of water per mole of tetrahydrofuran. As aforementioned, the reaction of the present invention is essentially a liquid-phase reaction. Accordingly, the temperature and pressure conditions should be selected so as to maintain the desired liquid phase. Because tetrahydrofuran depresses the freezing point of water, temperatures well below 0° C. may be utilized, e.g., as low as −50° C. Likewise, because of the presence of materials which raise the boiling point of the reaction medium and/or because of the possible use of superatmospheric pressures, elevated temperatures, e.g., temperatures above the atmospheric boiling point of both tetrahydrofuran and water, may also be utilized. More typically, however, the temperature of the reaction mixture during the controlled reaction is maintained in the range of about −20° C. to 100° C. The preferred temperature range at substantially atmospheric pressure is in the range of about −10° C. to 50° C.

In a particular embodiment of the present invention the reaction is carried out under controlled pH conditions, e.g., a pH in the range of about 0.1 to 11.0. It is preferred, however, to maintain the pH during the reaction within the range of about 0.5 to 5, optimally a pH of about 1 to 3. Prior to the addition of the halogen, the pH may be adjusted to the desired range by the addition of a suitable acid or base. To achieve the acid conditions normally preferred, it is customary to employ a suitable non-oxidizing, inorganic acid, e.g., a hydrohalic acid corresponding to the halogen employed, i.e., hydrochloric or hydrobromic acid; sulphuric acid, phosphoric acid or the like; preferably the corresponding hydrohalic acid. Because, as the addition of halogen is commenced, a hydrogen halide is formed as a by-product of the controlled reaction, the formed hydrogen halide should preferably be neutralized in part or in total as the controlled reaction proceeds so as to maintain the desired pH of the reaction medium. If, however, the pH were not initially adjusted to the desired acid-side pH range, it is preferable to allow the formed hydrogen halide to reduce the pH of the reaction mixture to the desired range before commencing neutralization.

Neutralization may be accomplished by the addition of an appropriate neutralizing agent as such or in solution or suspension in water. A variety of substances may be employed as neutralizing agents, preferably the oxides, hydroxides and carbonates of the alkali and alkaline earth materials, e.g., sodium hydroxide, sodium carbonate, calcium oxide, calcium hydroxide, calcium carbonate and the like, preferably sodium hydroxide.

The basic substance may be added to the reaction mixture prior to the introduction of the halogen but, in such case, the pH of the reaction mixture would not initially be on the desired acid side. Preferably, as aforementioned, the reaction mixture is initially adjusted to the acid side by acid addition, and the pH thereafter maintained in the desired acid side range during the reaction by the continuous or incremental addition of the neutralizing agent as the hydrogen halide is formed.

Even if the formed hydrogen halide is not neutralized during the reaction, it is nonetheless preferable to adjust the pH to a range of 0.5 to 5, preferably about 1 to 3, prior to product separation, particularly when separating by solvent extraction.

As aforementioned, after completion of the controlled reaction, any unreacted tetrahydrofuran may be recovered from the reaction product for reuse and the desired products separated by conventional recovery and separation techniques known to those skilled in the art. For example, any unreacted tetrahydrofuran may be recovered from the reaction mixture by distillation. The desired end products, i.e., gamma-hydroxy-butyraldehyde and/or gamma-butyrolactone, may then be recovered by further distillation or a combination of extraction and distillation. Typically, the extraction solvents may include tetrahydrofuran, diethyl ether, benzene, tetrahydropyran, diisopropyl ether, toluene, the xylenes, or other related materials. While the extraction may be carried out with the reaction crude as obtained, it is preferably conducted, as aforementioned, with the reaction crude adjusted to an acid side pH range, e.g., a pH of about 0.5 to 5, preferably a pH of 1 to 3.

When, for example, employing distillation as the separation technique, the reaction product is first filtered to remove any insoluble substances, such as any undissolved salts formed as a consequence of the neutralization of the formed hydrogen halide. After filtration, the distillation may proceed, with residual tetrahydrofuran coming over as an azeotrope with water, following which any remaining water is eliminated. Pressure may then be reduced and the desired products successively recovered by distillation at sub-atmospheric pressure.

The invention is further illustrated by the following specific examples in which the quantities are stated in parts by weight, unless otherwise indicated:

*Example 1*

A solution of 54,120 parts of tetrahydrofuran in 184,500 parts of water was charged into a reaction vessel equipped with a stirrer, a gas dispersion tube, a condenser and a thermometer immersed in the liquid. While maintaining the solution at 25–30° C., chlorine gas was introduced at a rate of about 15 parts per minute until 5330 parts had been reacted. The resulting solution was colorless and yielded gamma-hydroxybutyraldehyde, as its 2,4-dinitrophenylhydrazone, when a 10 milliliter aliquot was reacted with a hot aqueous solution of 2,4-dinitrophenylhydrazine hydrochloride. The resulting crude yellow-orange 2,4-dinitrophenylhydrazone was recrystallized once from water and yielded pure yellow platelets of gamma-hydroxybutyraldehyde derivative which melted at 119°–120° C. and showed no depression in melting point when admixed with a known specimen of the same compound. The remainder of the original reaction solution was neutralized with calcium carbonate, whereupon the crude mixture separated into two layers. The upper organic layer was separated and the excess tetrahydrofuran was distilled off at room temperature under reduced pressure. The liquid residue was then distilled in a vacuum of 10 millimeters of mercury, yielding a colorless liquid containing gamma-hydroxybutyraldehyde boiling at 55–58° C. and another liquid boiling at 82–86° C.

*Example 2*

Into a reaction vessel equipped as in Example 1 was charged a solution of 72,160 parts of tetrahydrofuran and 18,000 parts of water. While cooling the solution to 25–30° C., chlorine gas was introduced at a rate of about 18 parts per minute until 7100 parts had reacted. The resulting solution was neutralized with calcium carbonate as in Example 1, and again a separation into two layers occurred. The lower aqueous layer was washed with two 22,000 part portions of fresh tetrahydrofuran. The washings were then combined with the upper organic layer and unreacted tetrahydrofuran recovered as in Example 1. The liquid residue was distilled in a vacuum of 10 millimeters of mercury, yielding a colorless liquid boiling at 82–86° C. and a higher-boiling residue. The colorless distillate, having an index of refraction at 25° C. of 1.440, consisted principally of gamma-butyrolactone, which was characterized by reaction with phenylhydrazine to give the known colorless phenylhydrazide of gamma-hydroxybutyric acid, melting at 93–94° C., after recrystallization from chloroform. A mixed melting point with the same hydrazine derivative prepared from a known sample of butyrolactone showed no depression.

*Example 3*

Into a vessel equipped as in Example 1 was charged a solution of 3610 parts of tetrahydrofuran, 4100 parts of water and 2000 parts of concentrated hydrochloric acid (36%). While maintaining the solution at −5° to +5° C., chlorine gas was introduced at a rate of about 24 parts per minute until 7100 parts had been reacted. Every 30 minutes during the course of the reaction there was added 1000 parts of calcium carbonate and 1900 parts of water. The resulting colorless solution was extracted with ether in a liquid-liquid extractor, continuously for 16 hours. The extract was fractionally distilled at atmospheric pressure to recover the ether and then under a vacuum of 10 millimeters of mercury to yield 350 parts of gamma-hydroxybutyraldehyde, 2430 parts of gamma-butyrolactone and 430 parts of higher-boiling products.

*Example 4*

Into a vessel equipped as in Example 1 was charged a solution of 3610 parts of tetrahydrofuran, 4100 parts of water and 1000 parts of concentrated hydrochloric acid (36%). While maintaining the solution at −5° to +5° C., chlorine gas was introduced at a rate of about 18 parts per minute until 7100 parts had been reacted. Every 40 minutes during the course of the reaction there was added 1000 parts of calcium carbonate and 1100 parts of water. The resulting colorless solution was extracted with tetrahydrofuran in a liquid-liquid extractor continuously for 16 hours. The extract was fractionally distilled at atmospheric pressure to recover the tetrahydrofuran. After adding 100 parts of calcium carbonate the residue was then further distilled under vacuum to yield 2280 parts of gamma-butyrolactone.

*Example 5*

Into a vessel equipped as in Example 1 was charged a solution of 8640 parts of tetrahydrofuran, 27,600 parts of water and 720 parts of concentrated hydrochloric acid (36%). While maintaining the solution at 30–35° C., chlorine gas was introduced, initially at a rate of about 142 parts per minute and diminishing to about 107 parts per minute until about 17,040 parts had been added. Simultaneously as chlorine was introduced, calcium hydroxide was added, initially at a rate of about 148 parts per minute and concurrently diminishing to about 111 parts per minute, so as to maintain a pH in the range of about 1 to 3. A total of 17,760 parts of calcium hydroxide was added. The resulting solution was exhaustively extracted with benzene. The extract was fractionally distilled at atmospheric pressure to recover the benzene and then under a vacuum of 10 mm. of mercury to recover 8130 parts of gamma-butyrolactone and 1230 parts of higher boiling products.

*Example 6*

Into a vessel equipped as in Example 1 was charged a solution of 18,540 parts of tetrahydrofuran, 21,115 parts of water and 515 parts of concentrated hydrochloric acid (36%). While maintaining the solution at 35–40° C., chlorine gas was introduced, initially at a rate of about 244 parts per minute and diminishing to about 122 parts per minute until a total of about 37,780 parts had been added. Simultaneously as chlorine was introduced, a 50% aqueous solution of sodium hydroxide was added, initially at a rate of about 546 parts per minute and concurrently diminishing to about 273 parts per minute until about 85,075 parts had been reacted, whereby the pH of the reaction medium was maintained in the range of about 1 to 3. The resulting mixture was filtered free of the formed sodium chloride and the filter cake washed once with 10,300 parts of water and once with 10,300 parts of benzene. The filtrate and wash liquors were combined and extracted continuously for 17 hours in a liquid-liquid extractor with the benzene wash and an additional 41,200 parts of benzene. The extract was fractionally distilled at atmospheric pressure to recover the benzene and then under a vacuum of 10 mm. of mercury to recover 18,334 parts of gamma-butyrolactone and 1576 parts of higher-boiling products. The raffinate was subjected to a second continuous extraction with 51,500 parts of benzene, which by further work-up in the same manner yielded an additional 711 parts of gamma-butyrolactone and 309 parts of higher boiling products. In all, there was obtained 19,045 parts of gamma-butyrolactone and 1885 parts of higher-boiling products.

*Example 7*

Into a vessel equipped as in Example 1 was charged a mixture of 9000 parts of tetrahydrofuran, 50,000 parts of water and 31,000 parts of sodium carbonate monohydrate, resulting in an initial pH for the reaction mixture of about 11 to 13. While maintaining the reaction temperature at −5 to +5° C., chlorine gas was introduced at a rate of about 37 parts per minute until 17,750 parts had been reacted. The resulting mixture, which had a final pH of about 6 to 8, was filtered free of the formed sodium chloride, and the filtrate extracted continuously for 20 hours with 100,000 parts of tetrahydrofuran. The extract was fractionally distilled at atmospheric pressure to recover the tetrahydrofuran and then under a vacuum of 10 mm. of mercury to recover 4675 parts of gamma-butyrolactone and 2900 parts of higher-boiling products.

*Example 8*

Into a vessel equipped as in Example 1 was charged a solution of 22,500 parts of tetrahydrofuran, 25,625 parts of water and 6250 parts of concentrated hydrochloric acid (36%). While maintaining the solution at 0–10° C., chlorine gas was introduced at a rate of about 148 parts per minute until 45,140 parts had been reacted. Every 30 minutes during the course of the reaction there was added 7750 parts of sodium carbonate monohydrate, whereby the pH of the reaction medium was maintained in the range of about 0.5 to 4.0. A total of 70,750 parts of the sodium carbonate monohydrate was added. At the end of the reaction period an additional 15,750 parts of sodium carbonate monohydrate was added to neutralize the residual hydrochloric acid. The resulting mixture was filtered free of the formed sodium chloride, and the filtrate extracted continuously for 20 hours with 75,000 parts of tetrahydrofuran. The extract was fractionally distilled at atmospheric pressure to recover the tetrahydrofuran and then under a vacuum of 10 mm. of mercury to recover 15,450 parts of gamma-butyrolactone and 2400 parts of higher-boiling products. The raffinate was taken to a dry salt cake on removal of the water by azeotropic distillation with benzene. The salt cake was triturated with three portions of concentrated hydrochloric acid (36%), totalling 87,500 parts, and filtered. The filtrate was extracted continuously for 16 hours with 87,500 parts of benzene. After fractional distillation to recover the benzene there was obtained an additional 2875 parts of gamma-butyrolactone and 425 parts of higher-boiling products. In all, there was recovered a total of 18,325 parts of gamma-butyrolactone and 2825 parts of higher-boiling products.

*Example 9*

Into a vessel equipped as in Example 1 was charged a solution of 13,680 parts of tetrahydrofuran, 15,580 parts of water and 1900 parts of concentrated hydrochloric acid. While maintaining the solution at 5–10° C. chlorine gas was introduced at a rate of about 90 parts per minute until 26,980 parts had been reacted. Every 15 minutes during the course of the reaction there was added 1064 parts of calcium oxide (lime) and 1805 parts of water, whereby the pH of the reaction medium was maintained in the range of about 0.5 to 4.0. A total of 19,152 parts of lime and 32,490 parts of water was added. The resulting solution was extracted continuously for 16 hours with 41,800 parts of benzene. The extract was fractionally distilled at atmospheric pressure to recover the benzene and then under a vacuum of 10 mm. of mercury to recover 7790 parts of gamma-butyrolactone, 741 parts of lower-boiling products and 5719 parts of higher-boiling products.

*Example 10*

A solution of 72 parts of tetrahydrofuran in 80 parts of water and sufficient hydrobromic acid to bring the pH to 2.0, is charged into a vessel equipped with a stirrer, a condenser, a thermometer immersed in the liquid, and two dropping funnels. The solution is stirred and maintained at 25–30° C., and bromine is added dropwise at a rate of 1 part per minute until 320 parts of bromine have been added. Simultaneously with the bromine addition, a 50% aqueous solution of sodium hydroxide is added at a rate so as to maintain the pH in the range of about 1 to 3. After removing the formed sodium bromide by filtration, the reaction mixture is worked up as in Example 6 to give 71 parts of butyrolactone.

*Example 11*

A series of controlled pH experiments was made using, in each experiment, a solution of 1443 parts of tetrahydrofuran dissolved in 1640–1670 parts of water. The solution was charged into a reaction vessel equipped with a stirrer, gas dispersion tube, dropping funnel, condenser and, immersed in the liquid, a thermometer and pH electrodes which were connected externally to a pH meter. The solution was then adjusted to the desired pH by addition of concentrated hydrochloric acid. The temperature of the solution was adjusted to 30–35° C. and maintained in that range during the course of the reaction. A total of 2836 parts of gaseous chlorine was then added as fast as it was consumed in reaction under the environmental conditions imposed. Simultaneously, the pH of the reaction was maintained at the desired value by addition of a 50% aqueous solution of sodium hydroxide, except in the experiment at very low pH (below 0.1) where, instead of the base, 5000 parts of water was added at a comparable rate. On completion of the reaction, the crude was adjusted to a pH value of about 2 and the resulting mixture filtered free of the formed sodium chloride. Thereafter, the butyrolactone was recovered by washing the filter cake, combining the washings and filtrate, extracting with benzene and distilling in a manner similar to that described in Example 6. The results obtained at the various pH ranges were as follows:

| pH Range | Yield of butyrolactone | |
| --- | --- | --- |
| | Parts | Percent |
| Very low | 490 | 28.4 |
| 0.55±0.25 | 1,292 | 75.2 |
| 0.55±0.25 | 1,303 | 75.8 |
| 2.0±0.5 | 1,332 | 77.5 |
| 3.0±0.5 | 1,215 | 70.6 |
| 4.0±0.5 | 1,173 | 68.2 |
| 5.0±0.5 | 1,099 | 63.9 |

While particular embodiments of this invention have been described hereinabove, it will be understood, of course, that the invention is not limited thereto. Many modifications will be apparent from the above description to those skilled in the art, and it is contemplated by the claims of this specification to cover any such modifications as fall within the true spirit and scope of this invention.

Having thus described the invention, what is claimed is:

1. A process for preparing a compound of the group consisting of gamma-hydroxybutyraldehyde, gamma-butyrolactone and mixtures thereof which comprises contacting tetrahydrofuran in the liquid phase, in the presence of at least about 1 mole of water per mole of tetrahydrofuran and at a temperature above the freezing point and below the boiling point of the reaction medium and at a pH in the range of about 0.1 to 11.0, with a substance selected from the group consisting of chlorine, bromine and mixtures thereof, the mole ratio of said substance to tetrahydrofuran being from about 0.01 to not substantially in excess of about 2.

2. A process for preparing a compound of the group consisting of gamma-hydroxybutyraldehyde, gamma-butyrolactone and mixtures thereof which comprises contacting tetrahydrofuran in the liquid phase, in the presence of at least about 1 mole of water per mole of tetrahydrofuran and at a temperature in the range of about —20° C. to 100° C. and at a pH in a range of about 0.5 to 5, with about 0.01 to 2 moles of a substance per mole of tetrahydrofuran, said substance being selected from the group consisting of chlorine, bromine and mixtures thereof.

3. The process of claim 2 wherein the contacting step is carried out in said pH range of about 0.5 to 5 by adjusting the pH of the tetrahydrofuran and water to said pH range, prior to the contacting thereof with said substance, by the addition of a non-oxidizing, inorganic acid and maintaining the pH in said range during the contacting step by the addition of a neutralizing agent.

4. A process for preparing gamma-hydroxybutyraldehyde which comprises contacting tetrahydrofuran in the liquid phase, in the presence of at least 1 mole of water per mole of tetrahydrofuran, at a temperature in the range of about —20° C. to 100° C. and at a pH in the range of about 0.5 to 5, with about 0.05 to 0.4 mole of a substance per mole of tetrahydrofuran, said substance being selected from the group consisting of chlorine, bromine and mixtures thereof; and recovering gamma-hydroxybutyraldehyde from the resulting reaction product.

5. A process for preparing gamma-butyrolactone which comprises contacting tetrahydrofuran in the liquid phase, in the presence of at least one mole of water per mole of tetrahydrofuran, at a temperature in the range of about —20° to 100° C. and at a pH in the range of about 0.5 to 5 with about 1 to 2 moles of a substance per mole of tetrahydrofuran, said substance being selected from the group consisting of chlorine, bromine and mixtures thereof; and recovering gamma-butyrolactone from the resulting reaction product.

6. A process for preparing gamma-butyrolactone which comprises contacting tetrahydrofuran in the liquid phase in the presence of about 1 to 25 moles of water per mole of tetrahydrofuran, at a temperature in the range of about —10° C. to 50° C. and at a pH in the range of about 1 to 3 with about 1 to 2 moles of chlorine per mole of tetrahydrofuran; and recovering gamma-butyrolactone from the resulting reaction product.

7. A process of preparing a compound of the group consisting of gamma-hydroxybutyraldehyde, gamma-butyrolactone and mixtures thereof which comprises admixing tetrahydrofuran with about 1 to 25 moles of water per mole of tetrahydrofuran; adding a non-oxidizing, inorganic acid in sufficient quantity to adjust the admixture to a pH in a range of about 0.5 to 5; contacting the admixture in the liquid phase at a temperature in the range of about —20° C. to 100° C. with about 0.01 to 2 moles of a substance per mole of tetrahydrofuran, said substance being selected from the group consisting of chlorine, bromine and mixtures thereof; adding to said admixture during the contacting step a sufficient quantity of a neutralizing agent, whereby the pH is maintained in the range of about 0.5 to 5; and recovering the desired product from the reaction product.

8. A process for preparing gamma-butyrolactone which comprises admixing tetrahydrofuran with about 1 to 25 moles of water per mole of tetrahydrofuran; adding hydrochloric acid in sufficient quantity to adjust the admixture of tetrahydrofuran and water to a pH in a range of about 0.5 to 5; contacting the admixture in the liquid phase at a temperature in the range of about —10° C. to 50° C. with about 1 to 2 moles of chlorine per mole of tetrahydrofuran; adding to said admixture during the contacting step sufficient neutralizing agent, whereby the pH is maintained in the range of about 0.5 to 5; and recovering gamma-butyrolactone from the resulting reaction product.

9. The process of claim 8 wherein the contacting step is carried out by introducing chlorine into the admixture of tetrahydrofuran and water at the maximum rate at which the chlorine can be consumed by the resulting reaction.

10. The process of claim 8 wherein said neutralizing agent is sodium hydroxide.

No references cited.